United States Patent
Tison et al.

(10) Patent No.: US 7,424,895 B2
(45) Date of Patent: Sep. 16, 2008

(54) METHOD AND SYSTEM FOR FLOW MEASUREMENT AND VALIDATION OF A MASS FLOW CONTROLLER

(75) Inventors: Stuart A. Tison, McKinney, TX (US); Sandeep Sukumaran, McKinney, TX (US); James Barker, Lewisville, TX (US)

(73) Assignee: Celerity, Inc., Austin, TX (US)

( * ) Notice: Subject to any disclaimer, the term of this patent is extended or adjusted under 35 U.S.C. 154(b) by 240 days.

(21) Appl. No.: 10/946,031

(22) Filed: Sep. 21, 2004

(65) Prior Publication Data

US 2006/0011237 A1    Jan. 19, 2006

Related U.S. Application Data

(63) Continuation-in-part of application No. 10/887,591, filed on Jul. 9, 2004.

(51) Int. Cl.
*G01F 1/34* (2006.01)

(52) U.S. Cl. .............................. 137/12; 137/2; 137/486; 137/487.5; 73/1.16; 73/861.43

(58) Field of Classification Search .............. 137/2, 137/9, 12, 486, 487.5; 73/1.16, 1.34, 1.35, 73/31.04, 861.42, 861.43; 702/45, 100, 50, 702/51
See application file for complete search history.

(56) References Cited

U.S. PATENT DOCUMENTS

| | | | |
|---|---|---|---|
| 2,773,384 A * | 12/1956 | Gehre ...................... 73/861.83 |
| 3,222,918 A | 12/1965 | Kuntz et al. |
| 3,363,461 A | 1/1968 | Minkoff |
| 3,911,256 A | 10/1975 | Jones |
| 3,958,443 A | 5/1976 | Berrettini |
| 4,146,051 A * | 3/1979 | Sparks ........................ 137/486 |
| 4,195,516 A | 4/1980 | Fredericks |
| 4,285,245 A * | 8/1981 | Kennedy ...................... 73/861 |
| 4,364,413 A * | 12/1982 | Bersin et al. .............. 137/624.2 |
| 4,498,347 A * | 2/1985 | Grantham et al. ......... 73/861.66 |
| 4,651,788 A | 3/1987 | Grosskreuz et al. |
| 4,867,375 A | 9/1989 | Ueki et al. |
| 5,016,482 A * | 5/1991 | Clingman et al. ......... 73/863.61 |
| 5,051,920 A * | 9/1991 | Reams et al. .................. 702/45 |
| 5,054,650 A * | 10/1991 | Price .............................. 222/1 |
| 5,062,446 A * | 11/1991 | Anderson .................... 137/468 |

(Continued)

OTHER PUBLICATIONS

International Search Report and Written Opinion for PCT/US05/24084.

(Continued)

*Primary Examiner*—John Rivell
*Assistant Examiner*—Craig Price
(74) *Attorney, Agent, or Firm*—Lowrie, Lando & Anastasi, LLP

(57) ABSTRACT

Systems and methods for flow verification and validation of mass flow controllers are disclosed. A mass flow controller may be commanded to a specified flow and flow measurement commenced. During an interval, gas is accumulated in a first volume and measurements taken within this volume. The various measurements taken during the interval may then be used to calculate the flow rate. The flow rate, in turn, may be used to determine the accuracy of the mass flow controller relative to a setpoint.

25 Claims, 11 Drawing Sheets

U.S. PATENT DOCUMENTS

| | | | |
|---|---|---|---|
| 5,107,441 A * | 4/1992 | Decker .................. 702/47 |
| 5,129,418 A * | 7/1992 | Shimomura et al. .......... 137/486 |
| 5,150,690 A * | 9/1992 | Carter et al. ............ 123/527 |
| 5,201,581 A | 4/1993 | Vander Heyden et al. |
| 5,299,447 A | 4/1994 | Caron |
| 5,394,755 A * | 3/1995 | Sudo et al. .................... 73/861 |
| 5,421,365 A * | 6/1995 | Matsuo et al. ......... 137/599.14 |
| 5,445,035 A | 8/1995 | Delajoud |
| 5,684,245 A | 11/1997 | Hinkle |
| 5,710,370 A * | 1/1998 | Shanahan et al. ............ 73/1.35 |
| 5,744,695 A * | 4/1998 | Forbes ................ 73/1.35 |
| 5,865,205 A * | 2/1999 | Wilmer .................. 137/2 |
| 5,873,351 A * | 2/1999 | Vars et al. ................ 123/527 |
| 5,900,534 A | 5/1999 | Miller et al. |
| 5,911,238 A * | 6/1999 | Bump et al. ............. 137/487.5 |
| 5,925,829 A | 7/1999 | Laragione et al. |
| 6,119,710 A * | 9/2000 | Brown .................. 137/14 |
| 6,216,726 B1 | 4/2001 | Brown et al. |
| 6,302,130 B1 * | 10/2001 | Ohmi et al. .................... 137/14 |
| 6,343,617 B1 * | 2/2002 | Tinsley et al. .............. 137/486 |
| 6,450,200 B1 * | 9/2002 | Ollivier ................. 137/624.12 |
| 6,451,467 B1 * | 9/2002 | Peschke et al. ................ 429/23 |
| 6,539,968 B1 * | 4/2003 | White et al. .................. 137/10 |
| 6,564,825 B2 * | 5/2003 | Lowery et al. ........... 137/487.5 |
| 6,712,084 B2 * | 3/2004 | Shajii et al. ................... 137/12 |
| 7,150,201 B2 | 12/2006 | Tison et al. |
| 7,174,263 B2 | 2/2007 | Shajii et al. |
| 2002/0173923 A1 | 11/2002 | Schutzbach et al. |
| 2006/0005882 A1 | 1/2006 | Tison et al. |
| 2006/0217900 A1 | 9/2006 | Shajii et al. |

OTHER PUBLICATIONS

International Search Report and Written Opinion for PCT/US05/24084, Dec. 18, 2006.

* cited by examiner

METHOD AND SYSTEM FOR FLOW MEASUREMENT AND VALIDATION OF A MASS FLOW CONTROLLER

RELATED APPLICATIONS AND PATENTS

This application is a continuation-in-part of, and claims priority under 35 U.S.C. § 120 to, U.S. patent application Ser. No. 10/887,591, by Stuart A. Tison, et al., filed Jul. 9, 2004 entitled "Method and System for Flow Measurement and Validation of a Mass Flow Controller," which is hereby fully incorporated by reference.

This application is related to U.S. Pat. No. 6,343,617, entitled "System and Method of Operation of a Digital Mass Flow Controller," by Tinsley et al., issued on Feb. 5, 2002; U.S. Pat. No. 6,640,822, entitled "System and Method of Operation of a Digital Mass Flow Controller," by Tinsley et al., issued on Nov. 4, 2003; U.S. Pat. No. 6,681,787, entitled "System and Method of Operation of a Digital Mass Flow Controller," by Tinsley et al., issued on Jan. 27, 2004; U.S. Pat. No. 6,389,364, entitled "System and Method for a Digital Mass Flow Controller," by Vyers, issued on May 14, 2002; U.S. Pat. No. 6,714,878, entitled "System and Method for a Digital Mass Flow Controller," by Vyers, issued on Mar. 30, 2004; U.S. Pat. No. 6,445,980, entitled "System and Method for a Variable Gain Proportional-Integral (PI) Controller," by Vyers, issued on Sep. 3, 2002; U.S. Pat. No. 6,449,571, entitled "System and Method for Sensor Response Linearization," by Tariq et al., issued on Sep. 10, 2002; U.S. Pat. No. 6,575,027, entitled "Mass Flow Sensor Interface Circuit," by Larsen et al., issued on Jun. 10, 2003; U.S. Pat. No. 5,901,741, entitled "Flow Controller, Parts of Flow Controller, and Related Method," by Mudd et al., issued on May 11, 1999; U.S. Pat. No. 5,850,850, entitled "Flow Controller, Parts of Flow Controller, and Related Method," by Mudd, issued on Dec. 22, 1998; U.S. Pat. No. 5,765,283, entitled "Method of Making a Flow Controller," by Mudd, issued on Jun. 16, 1998. All patents and applications cited within this paragraph are fully incorporated herein by reference.

TECHNICAL FIELD OF THE INVENTION

The invention relates in general to methods and systems for validating the performance of a mass flow controller, and more particularly, to validating the performance of a mass flow controller using a rate of rise flow standard.

BACKGROUND OF THE INVENTION

Modern manufacturing processes sometimes require precise stoichiometric ratios of chemical elements during particular manufacturing phases. To achieve these precise ratios, different process gases may be delivered into a process chamber during certain manufacturing phases. A gas panel may be used to deliver these process gasses to a process tool with one or more chambers or reactors. A gas panel is an enclosure containing one or more gas pallets dedicated to deliver process gases to the process tool. The gas panel is in turn composed of a group of gas pallets, which is itself composed of a group of gas sticks.

A gas stick assembly may contain several discrete components such as an inlet fitting, manual isolation valve, binary controlled pneumatic isolation valves, gas filters, pressure regulators, pressure transducers, inline pressure displays, mass flow controllers and an outlet fitting. Each of these components is serially coupled to a common flow path or dedicated channel for one particular process gas. A manifold and a valve matrix channel the outlet of each gas stick to the process chamber.

To achieve a certain stoichiometric ratio, a process tool controller asserts setpoints to the mass flow controllers, and sequences the valve matrices, associated with certain gas sticks. The indicated flow value is output by the mass flow controller of each gas stick and monitored by the process tool controller.

A mass flow controller (MFC) is constructed by interfacing a flow sensor and proportioning control valve to a control system. The flow sensor is coupled to the control system by an analog to digital converter. The control valve is driven by a current controlled solenoid valve drive circuit. A mass flow measurement system is located upstream of the control valve. The control system monitors the setpoint input and flow sensor output while refreshing the control valve input and indicated flow output. Closed loop control algorithms executed by the embedded control system operate to regulate the mass flow of process gas sourced at the inlet fitting through the proportioning control valve and outlet fitting such that the real-time difference or error between the setpoint input and indicated flow output approaches zero or null as fast as possible with minimal overshoot and as small a control time as possible.

As over 500 species of gases may be used in the manufacturing of certain electronic components, the operation of each of the respective mass flow controllers is critical. Typically, these mass flow controllers are validated using the process chamber itself. FIG. 1 depicts one such prior art system where process chamber 130 is used as a flow verification tool. To verify mass flow controller 120, a setpoint signal is input to mass flow controller 120 which in turn begins flowing gas to process chamber 130. As the volume of process chamber 130 is known, a primary flow measurement technique known as rate-of-rise may be utilized to measure the flow into that volume. This method utilizes the conservation of mass principle and the equation of state of the gas to derive a relationship between the pressure in a fixed volume and the flow (mass flow) into that volume. The equation is given as, $$\dot{m} = \frac{\left[\frac{\Delta P \cdot V}{RT}\right]}{\Delta t} \qquad \text{eq. (1)}$$

where $\Delta P$ is the change in pressure over the interval $\Delta t$, R is the universal gas constant, T is the absolute temperature of the gas, and V is the volume of the measurement chamber. Eq. 1 utilizes the ideal gas equation as the equation of state; similar equations can be derived for other equations of state.

Unfortunately, the volume of typical process chamber 130, which may be on the order of 20 to 60 liters makes measurements of small flow extraordinarily time consuming. Additionally, process chamber 130 may exhibit large temperature gradients throughout its volume, distorting both the measurement and calculation of the mass flow into process chamber 130.

FIG. 2 shows the amount of time required to achieve a given change in pressure for some typical flow rates using typical process chamber 130 of between 20 and 60 liters. Due to many other constraints, a minimum pressure of 0.1 Torr may be required to initiate the measurement, and 0.3 Torr minimum accumulated pressure required to make the measurement. As a result, to perform a single flow point validation of a 2 sccm flow can require up to 5 minutes and verification of a mass flow controller may then take as long as 30 minutes. This lengthy validation cycle decreases the tool availability and adds cost to the user.

In addition to the slowness of the measurement, the accuracy of the measurement is typically no better than +/−5% of the reading. The primary contributing errors are: errors in temperature, errors in chamber volume, and unaccounted for gases (adsorption or desorption).

Other methods of validating mass flow controller 120 may utilize a secondary volume in parallel to process chamber 130 to measure flow. However, these methods do not allow the measuring of transient (non steady-state) performance of mass flow controller 120, and the many steps required to determine the volume upstream of mass flow controller 120 make this technique difficult to integrate into existing systems and may exacerbate already long time requirements for validation.

Thus, there is a need for systems and methods for validating a mass flow controller which can quickly measure dynamic performance and validate a mass flow controller, while simultaneously improving the accuracy of the validation process by reducing measurement uncertainties.

SUMMARY OF THE INVENTION

Systems and methods for flow verification and validation of mass flow controllers are disclosed. These systems and methods are capable of measuring the dynamic performance of a mass flow controller and may perform flow verification and measurement in one step. A choking orifice may be used in conjunction with a volume to accurately determine a flow rate irrespective of the geometry or pressure of the volume upstream of the choking orifice. Additionally, an error curve may be derived and fitted utilizing error points determined using the choking orifice. Subsequently, flow may be calculated without use of the choking orifice and adjusted based on the derived and fitted error curve. A mass flow controller may be coupled to a measurement system. The mass flow controller may be commanded to a specified flow and the system may begin flow measurement. The various measurements taken during this interval may then be used to calculate the flow rate. The flow rate, in turn, may be used to determine the accuracy of the mass flow controller relative to a setpoint.

In one embodiment, first data pertaining to a first volume is collected during a first interval, a first flow is then calculated and adjusted based on an error curve.

In another embodiment, the error curve is determined by fitting a derived error curve to a set of error points, including a set of determined error points, wherein each determined error point is determined by: collecting second data pertaining to the first volume during a second interval at a first setpoint, with a choking orifice in an open position; calculating a second flow based on the second data; collecting third data pertaining to the first volume during a third interval at the first setpoint, with the choking orifice in a choked position; calculating a third flow based on the third data; and comparing the second flow with the third flow.

In other embodiments, the choking orifice is operable to create a pressure gradient in the choked position, where the pressure upstream of the choking orifice is approximately twice that of the pressure downstream of the choking orifice.

In yet another embodiment, the choking orifice is operable to create the pressure gradient when the first setpoint is at least 500 sccm.

In still other embodiments, each of the set of determined error points represents an error where the first setpoint is at least 500 sccm.

In one more embodiment, the set of error points includes a set of observed error points, wherein each observed error point is determined by: collecting fourth data pertaining to the first volume during a fourth interval at a second setpoint and calculating a fourth flow based on the fourth data.

In still another embodiment, the error curve is adjusted based on a type of gas.

In one embodiment, a system is coupled to the mass flow controller downstream of the mass flow controller, the system comprising, a chamber, a first valve coupled to the chamber upstream of the chamber, a pressure sensor coupled to the chamber downstream of the chamber and a choking orifice coupled to the chamber upstream of the pressure sensor.

In a particular embodiment, the system is operable to collect first data pertaining to a first volume during a first interval and calculate a first flow.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DESCRIPTION OF PREFERRED EMBODIMENTS

Figure 1:
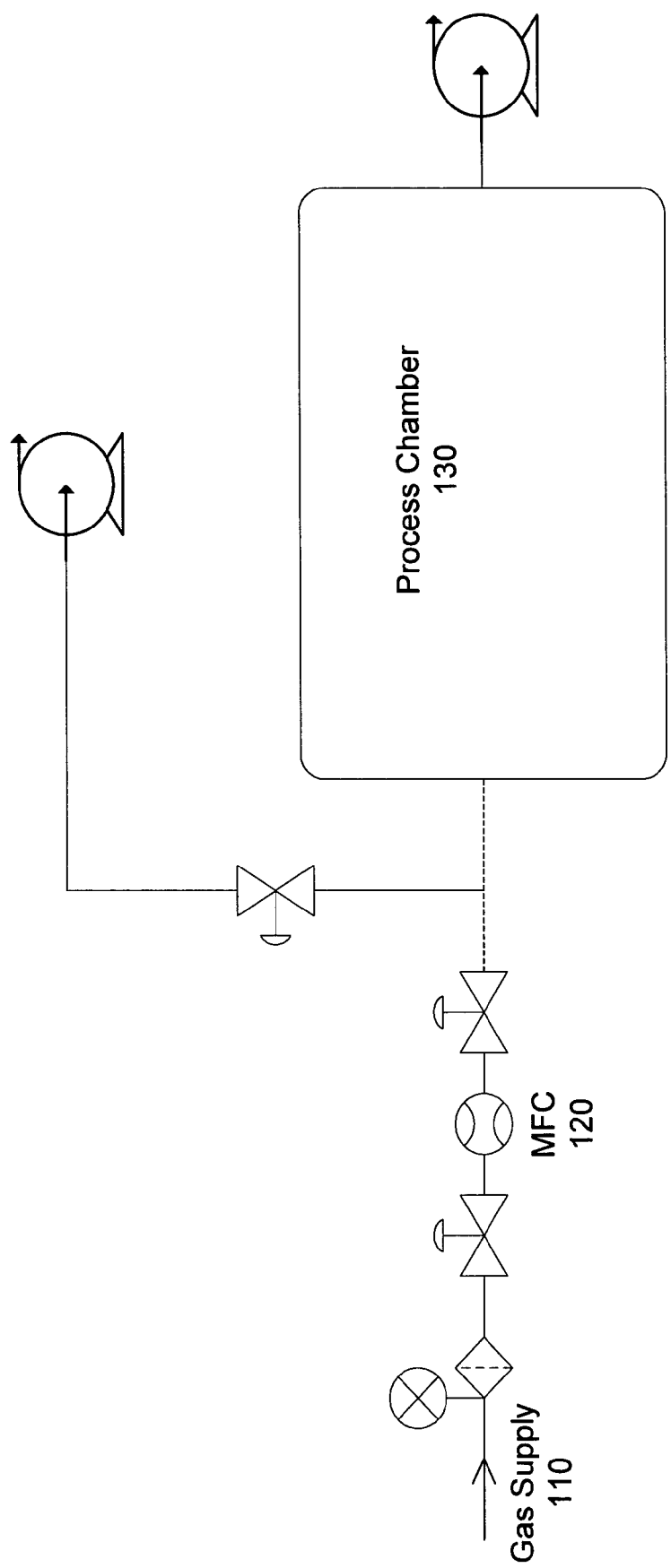
FIG. 1 includes an illustration of a conventional prior art system for validating a mass flow controller using a process chamber.
Figure 2:
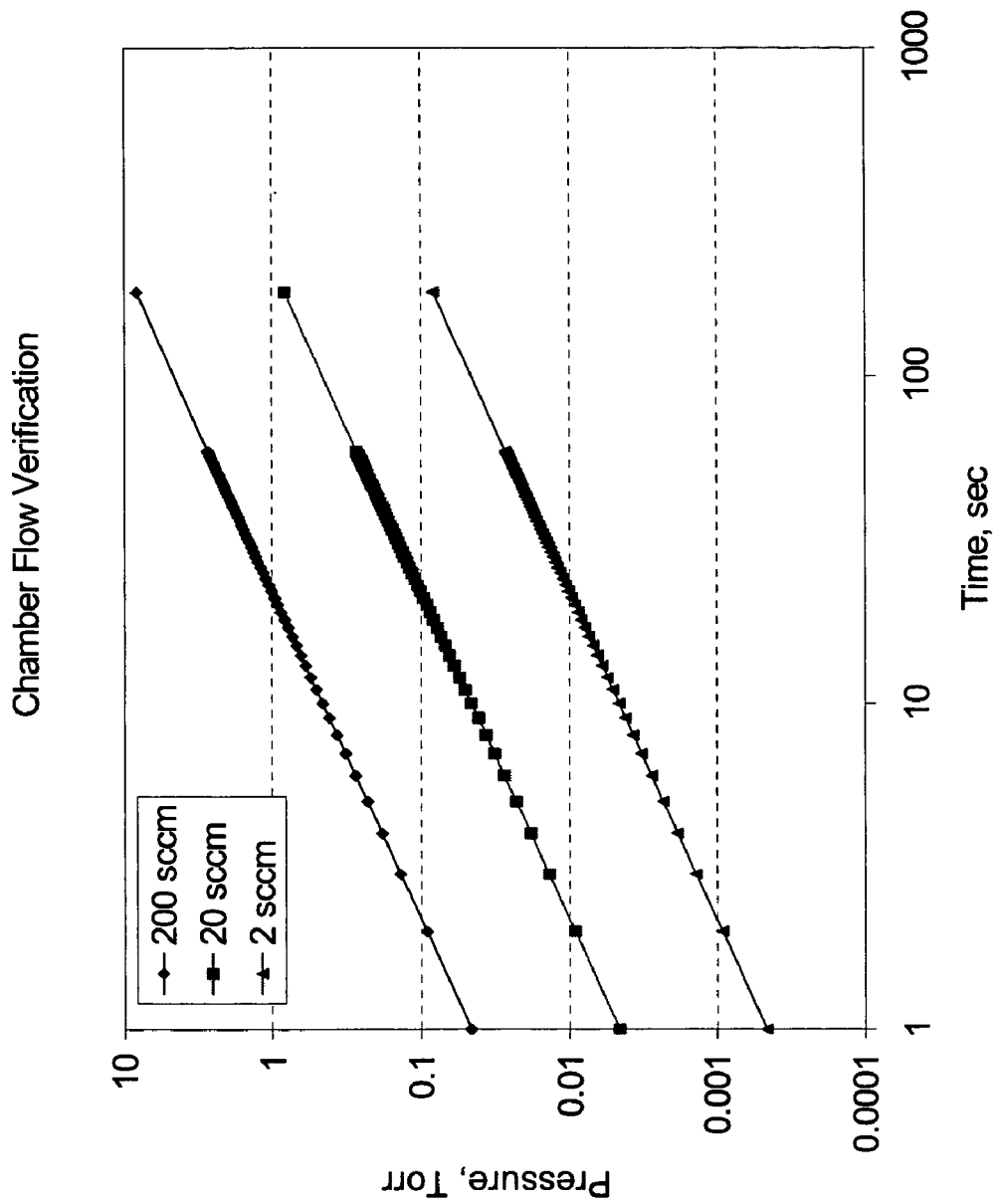
FIG. 2 includes a graph of the time required to achieve a change in pressure for some typical flow rates when utilizing a process chamber in the flow verification process.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. After reading the specification, various substitutions, modifications, additions and rearrangements which do not depart from the scope of the appended claims will become apparent to those skilled in the art from this disclosure.

Attention is now directed to systems and methods for flow verification and validating mass flow controllers which are capable of measuring the dynamic performance of a mass flow controller. Two volumes may be used in conjunction to accurately determine a total volume during the measurement sequence, minimize false flow conditions and reduce sensitivity to pressure transients.

The mass flow controller may be coupled to a measurement system. The mass flow controller may be commanded to a specified flow and the system may begin flow measurement. Gas may be accumulated in a volume between the mass flow controller and the measurement system and the pressure measured within this volume. Gas may then flow into a known volume and the pressure measured. The various measurements taken during the two intervals may then be used to calculate the volume between the mass flow controller and the measurement system and the flow rate, the flow rate in turn may be used to determine the accuracy of a mass flow controller relative to a setpoint. Similarly, these systems and methods may also allow the testing of the leak through of valves within a mass flow controller. By signaling a flow rate of zero to a mass flow controller, detected changes in pressure may be attributed to leak through of those valves.

These systems and methods may employ a rate-of-rise technique to measure the performance of a mass flow controller, combining the gas equation of state and conservation of mass principles to derive a similar equation to Eq. 1, where mass flow may be determined by:

$$\dot{m} = \frac{\left[\frac{\Delta P \cdot V}{ZRT}\right]}{\Delta t} \quad \text{Eq. (2)}$$

where $\Delta P$ is the change in pressure over the interval $\Delta t$, R is the universal gas constant, T is the absolute temperature of the gas, Z is the gas compressibility factor, and V is the volume of the measurement chamber. The gas compressibility factor Z is typically equal to unity for light gases and can be significantly less than unity for heavier molecules such as $WF_6$. Use of the compressibility factor may improve the accuracy of flow measurements with non-ideal, compressible gases.

Figure 3:
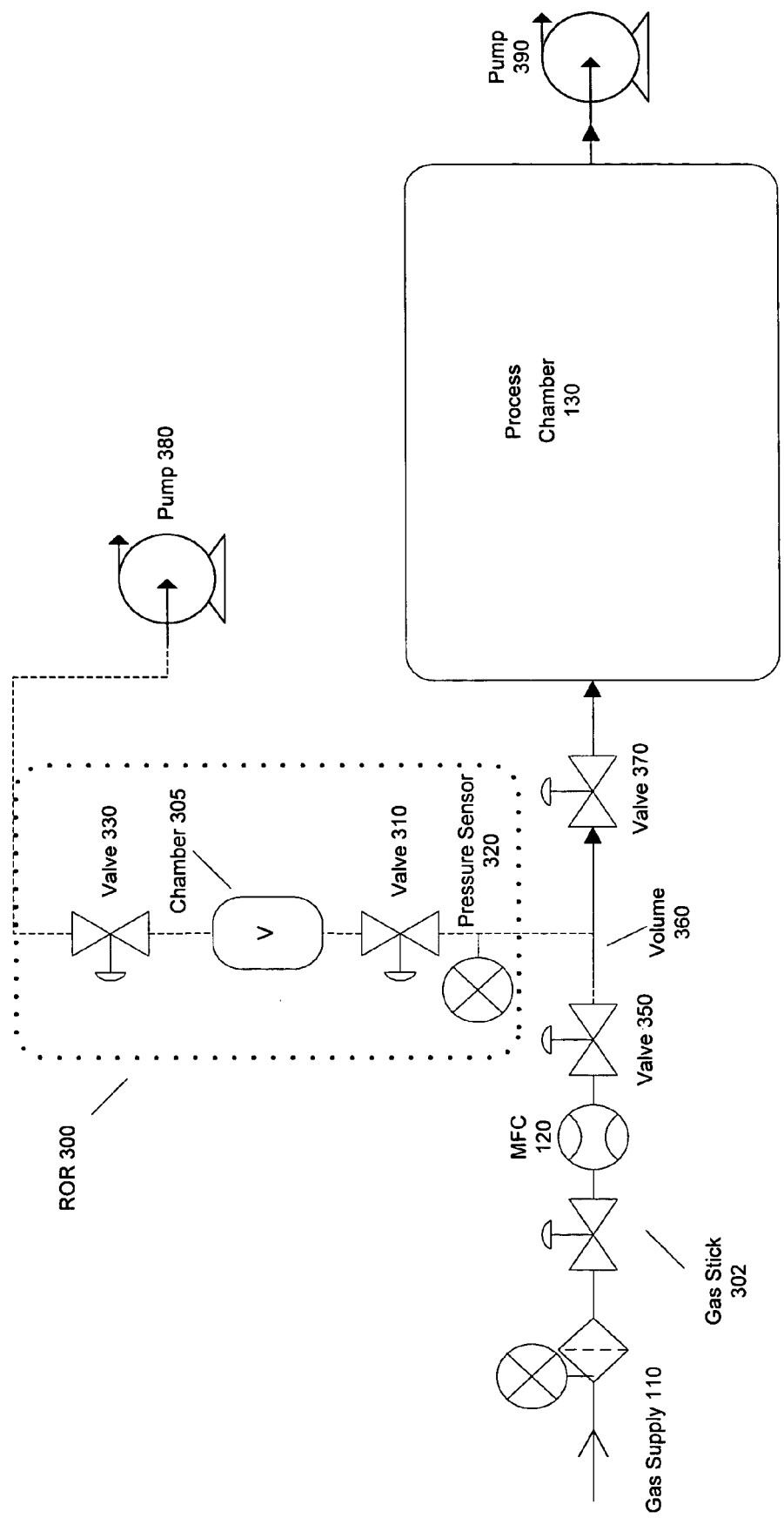
FIG. 3 includes a block diagram of one embodiment of a system for the validation of a mass flow controller.

Turning now to FIG. 3, an exemplary embodiment of a hardware arrangement which may be incorporated into the flow of gas in parallel to a process chamber to implement the systems and methods of the present invention is depicted. Rate of rise system (ROR) 300 may be utilized to measure the accuracy of flow controller 120 with respect to a setpoint. Rate of rise system 300 may be incorporated in the flow of gas through gas stick 302 to process chamber 130. In one particular embodiment, valves 350, 370 are downstream of a mass flow controller 120 and upstream of process chamber 130. ROR 300 may contain chamber 305 between valves 330, 310 and pressure sensor 320 upstream of valve 310. Pressure sensor may be of the type commonly known in the art, capable of measuring pressures from 0.1 Torr to 1000 Torr. Chamber 305 typically has a volume of anywhere from 10 cc up to a liter, compared with a typical volume of between 10 and 60 liters for process chamber 130.

ROR 300 may be coupled into the flow of gas downstream of mass flow controller 120 and valve 350, and upstream of valve 370 and process chamber 130. The physical volume of the coupling between valves 350, 370 and 310 is represented by volume 360. In many cases, ROR 300 is coupled to the gas stick using 316L stainless steel tubing with a 0.25 to 0.5 inch diameter, though other material such as nickel or tungsten may used in the case where gas stick 302 is being utilized to transport a specialized gas. Gas flows from gas supply 110 to mass flow controller 120, which regulates the volume of gas which passes through in response to a setpoint, usually between 0.1 sccm and 100 liters a minute. If valves 310, 350 are open and valve 370 is closed, gas flows from mass flow controller 120 into chamber 305, however, if valves 350, 370 are open and valve 310 is closed gas flows from mass flow controller 120 into process chamber 130.

In certain embodiments, to enable flow measurement with ROR 300, valve 370 is closed to process chamber 130, valve 350 is opened to mass flow controller 120 and valve 310 within ROR 300 is closed. Mass flow controller 120 is commanded to a specified flow and ROR system 300 begins the flow measurement. The gas is accumulated in volume 360 between valves 350, 370 and valve 310 within ROR system 300. Pressure sensor 320 within ROR 300 is upstream of valve 310 and this geometry enables the measurement of pressure within volume 360. The pressure change as a function of time may be measured to be used later for quantification of the flow measurement. At some time $\Delta t_1$ valve 330 is closed and valve 310 is opened allowing gas to flow into chamber 305 of ROR 300, a known volume. The pressure continues to be monitored as a function of time with pressure sensor 320 in ROR 300.

Figure 4:
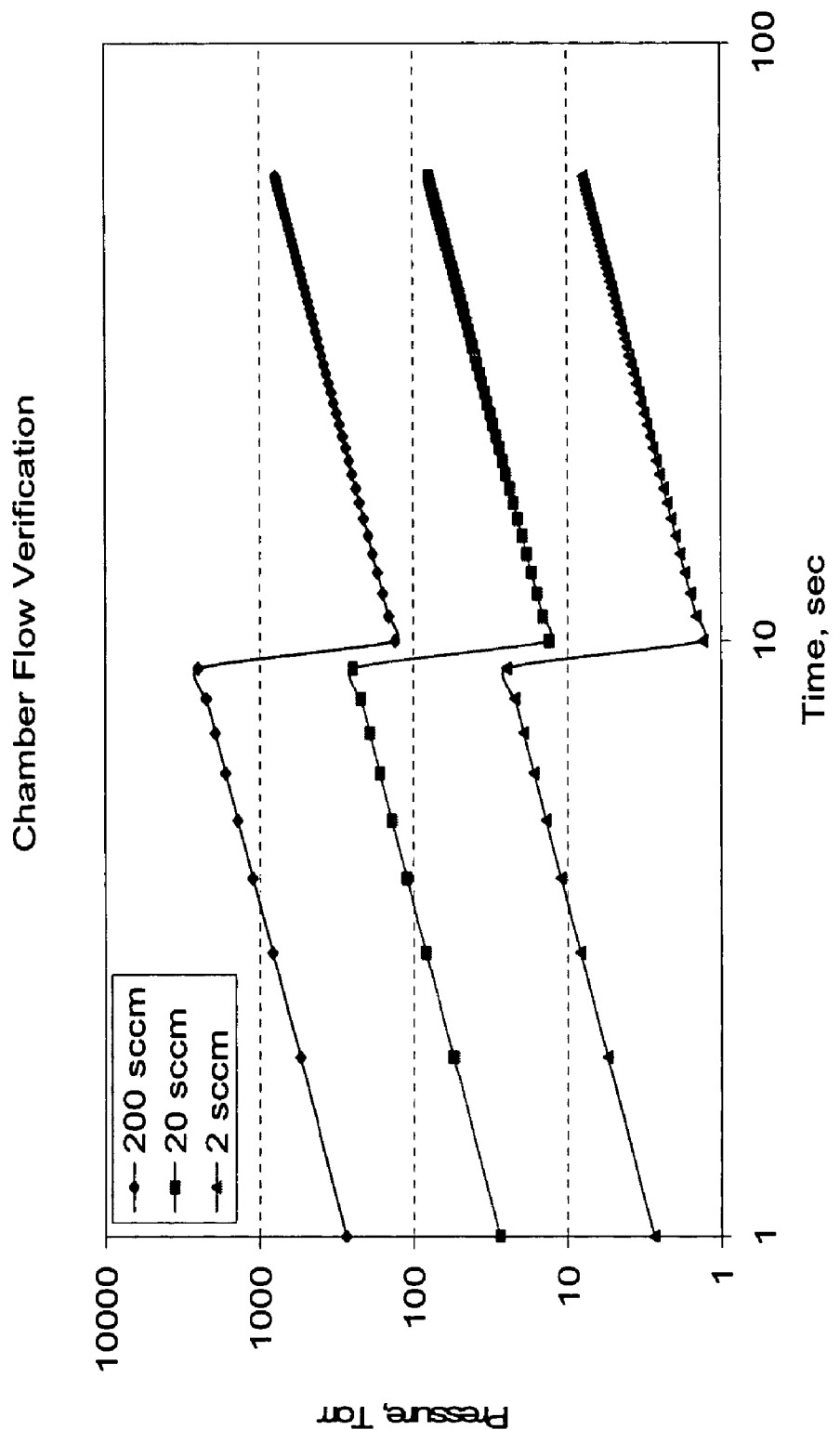
FIG. 4 includes a graph of pressure as a function of time utilizing one embodiment of the methods depicted.

A typical plot of the pressure change as a function of time is given in FIG. 4. In this figure, the initial pressure change depicted is that occurring in a sample volume 360 and the pressure change and time interval are $\Delta P_1$ and $\Delta t_1$ respectively. The second slope starting at approximately 10 seconds is when valve 2 is open and valve 3 is closed. In this case, the accumulating volume is the combination of volume 360, and the known volume of chamber 305. The pressure change with time is $\Delta P_2$ over the time interval $\Delta t_2$. Volume 360 may then be calculated using the expression below.

$$V = \frac{\left[\frac{\Delta P_2 \cdot V}{\Delta t_2}\right]}{\left[\frac{\Delta P_1}{\Delta t_1} - \frac{\Delta P_2}{\Delta t_2}\right]} \quad \text{eq. (3)}$$

Eq. 3 may then be used in conjunction with Eq. 2 to determine the flow. The determined flow may then be compared against the setpoint of mass flow controller to determine the accuracy of mass flow controller 120.

Figure 5:
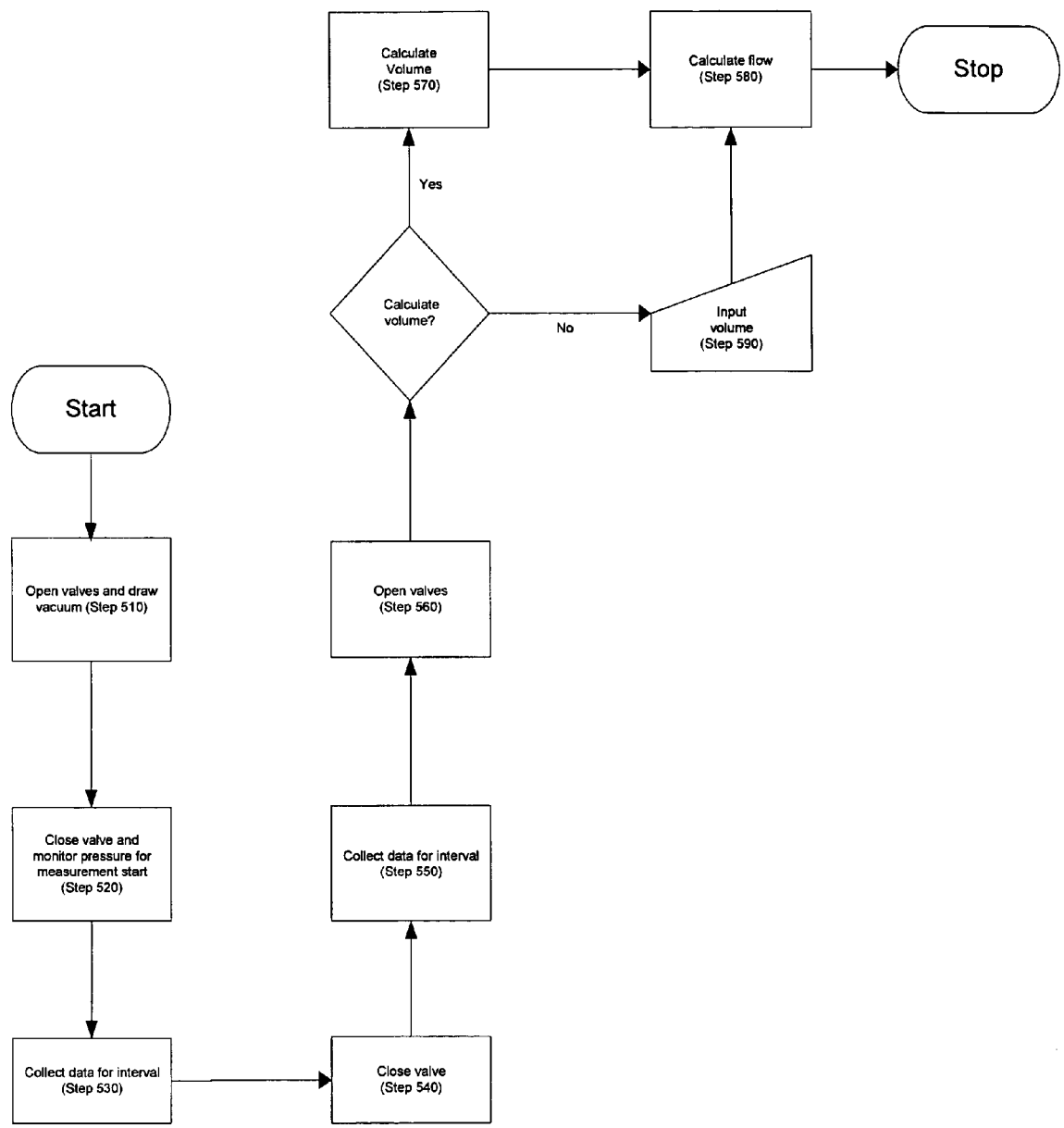
FIGS. 5-8 include flowcharts depicting various embodiments of methods to perform flow verification or validate the operation of a mass flow controller.

Turning now to FIG. 5, a flowchart for one embodiment of a method for measuring flow attributes and validating the accuracy of a mass flow controller is depicted. This particular method may be advantageous when measuring large flows (greater than 200 sccm), as a larger volume is utilized during the initial transient measurement of the flow, reducing measurement uncertainties.

In one particular embodiment, valve 370 may be closed by a control system indicating that a testing or validation of mass flow controller is to be conducted. To begin the test valves 310, 330 are opened and a vacuum is drawn (step 510) by pump 380. Valve 330 is then closed and data may be taken for the initial state (Step 520). With mass flow controller 120 flowing based on a certain setpoint, data may then be collected for a first interval (Step 530). Time, pressure and temperature may be monitored for a certain period using sensors known in the art, such as pressure sensor 320. In some embodiments, the length of this period may be determined by a pressure or time checkpoint. For example, when the pressure within volume reaches a certain Torr, the first interval may be concluded. The pressure at which the first interval concludes may vary greatly depending on the flow being measured, but is usually between 10 Torr and 1000 Torr. The first interval may also be concluded after a predetermined amount of time, usually at least 10 seconds, but not more than 60, seconds.

After the conclusion of the first interval (Step 530), valve 310 may then be closed (Step 540) and data collected for a second interval (Step 550). As during the first interval, this data may include pressure, temperature and time, and the length of the second interval may be determined using the same criteria as discussed with respect to the first interval above.

After the conclusion of the second interval (Step 550) volume 360 and flow attributes may then be calculated (Steps 570, 580) using Eq. 2 and Eq. 3. Alternatively, volume 360 may be input (Step 590) and then flow attributes may be calculated (Step 580) using the entered volume. The flow may then be compared to the original setpoint of mass flow controller 120 to determine the accuracy of mass flow controller 120.

It will be understood by those of ordinary skill in the art that the various steps, measurements, and calculations may be controlled and performed in a wide variety of ways, including by a control system embedded within ROR system 300, or by the control system utilized in conjunction with mass flow controller 120, gas stick 302 and process chamber 130.

Figure 6:
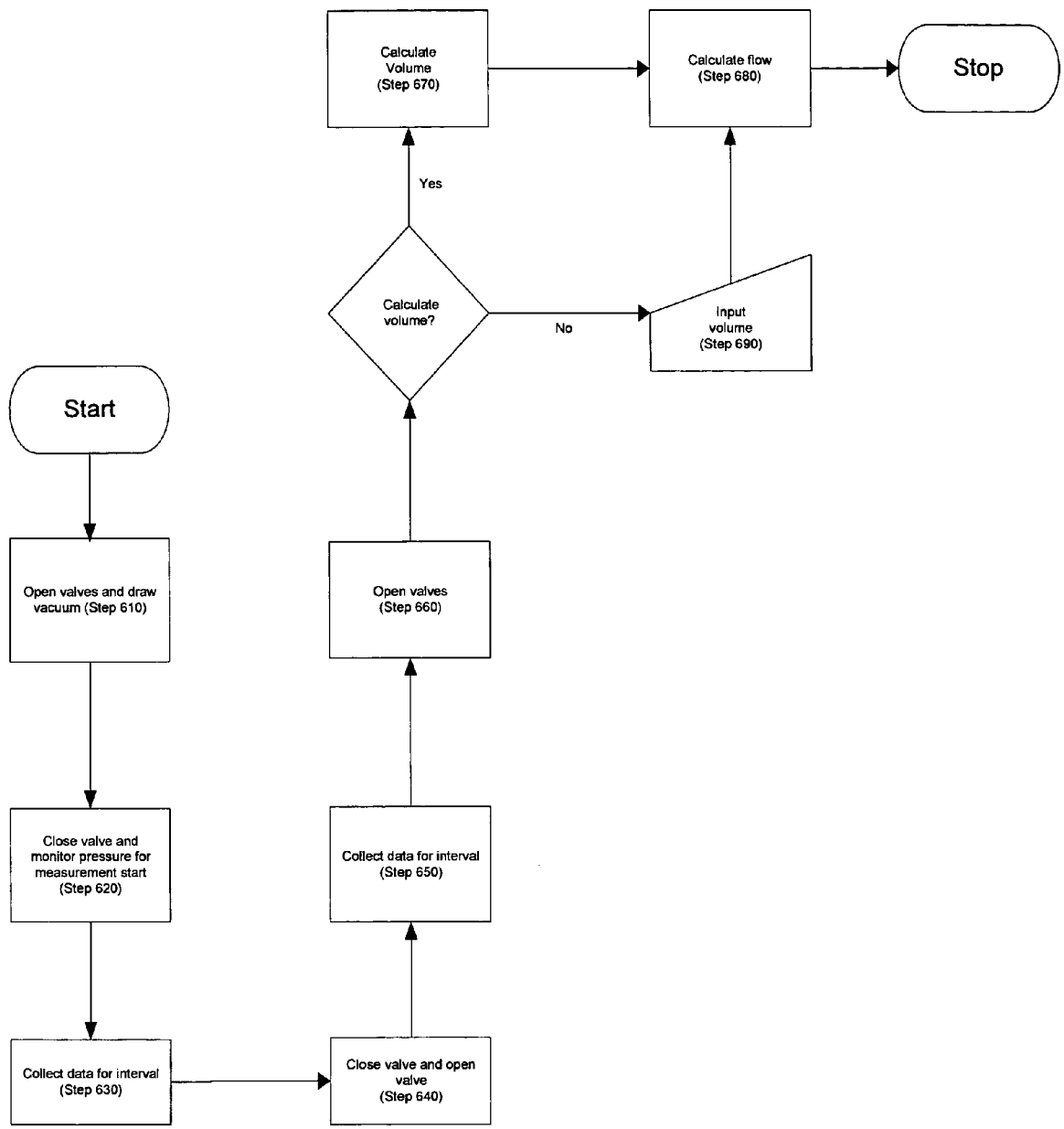

Similarly, FIG. 6 is a flowchart of a method for measuring flow and validating mass flow controller 120 which may be advantageous for moderate flows (20 sccm-200 sccm) where using the larger volume of chamber 305 during the initial transient phase is not necessarily useful.

In one embodiment valve 370 may be closed by a control system indicating that a flow measurement or validation of mass flow controller 120 is to be conducted. To conduct a test of mass flow controller, valves 310, 330 are opened and a vacuum is drawn (Step 610) by pump 380. Valve 310 is then closed and data may be taken for the initial state (Step 620). With mass flow controller 120 flowing based on a certain setpoint, data may then be collected for a first interval (Step 630). Time, pressure and temperature may be monitored for a certain period using sensors known in the art, such as pressure sensor 320. The length of this period may be determined by a pressure or time checkpoint, as discussed above with respect to FIG. 5.

After the conclusion of the first interval (Step 630), valve 330 may be closed valve 310 opened (Step 640) and data collected for a second interval (Step 550). As during the first interval, this data may include pressure, temperature and time, and the length of the second interval may be determined using the same criteria as discussed with respect to the first interval above.

After the conclusion of the second interval (Step 650) volume 360 and flow attributes may then be calculated (Steps 670, 680) using Eq. 2 and Eq. 3. Alternatively, volume 360 may be input (Step 690) and then flow attributes may be calculated (Step 680) using the entered volume. The flow may then be compared to the original setpoint of mass flow controller 120 to determine the accuracy of mass flow controller 120.

Once volume 360 between valves 350, 370 and 310 is determined, flow measurement may be conducted using only volume 360. In many installations volume 360 is small (less than 20 cc), consequently the pressure change for a specified flow rate easier to measure, typically reducing the measurement time for a given flow rate by a factor of five.

Figure 7:
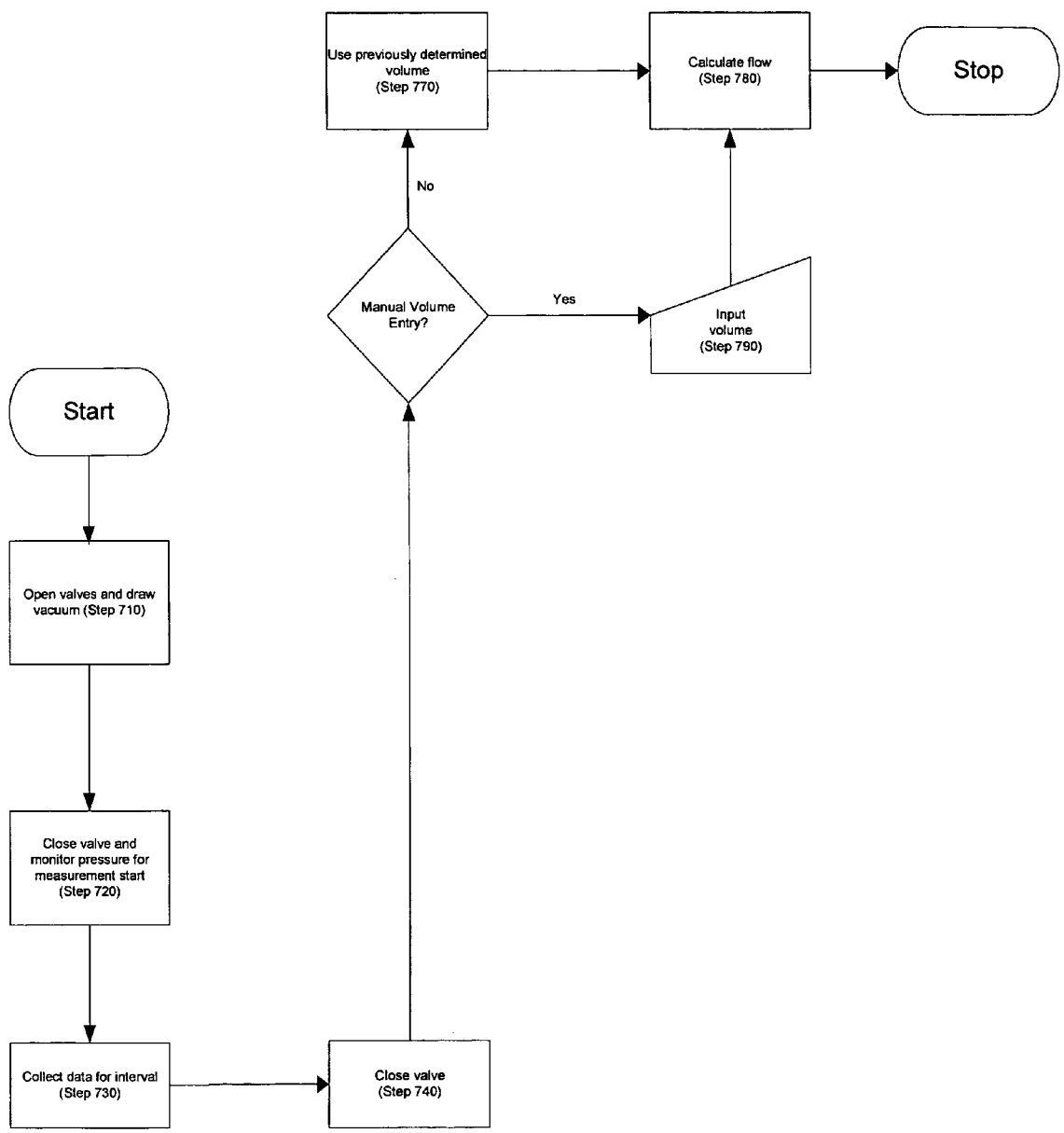

FIG. 7 illustrates one method for utilizing volume 360 for measuring flow attributes or verification of mass flow controller 120. This method may be particularly effective for flow rates less than 20 sccm, and allow the use of a much shorter measurement interval. Valve 370 may be closed by a control system indicating that a flow measurement or validation of mass flow controller 120 is to be conducted. To conduct a test of mass flow controller, valves 310, 330 are opened and a vacuum is drawn (Step 710) by pump 380. Valve 310 is then closed and data taken for the initial state (Step 720). With mass flow controller 120 flowing based on a certain setpoint, data may then be collected over a first interval (Step 730), as discussed above.

After the conclusion of the first interval (Step 730), valve 310 may be opened and valve 330 closed (Step 740). In certain cases it may be advantageous to open valve 330 before valve 310 so pressure is maintained in volume 360 throughout the entire first interval. After the conclusion of the first interval (Step 730) flow attributes may then be calculated (Step 780) using Eq. 2 and Eq. 3 and the previously determined measurement of volume 360 (Step 770). Alternatively, volume 360 may be input manually by a user (Step 790) and then flow attributes may be calculated (Step 780). The calculated flow may then be compared to the setpoint of mass flow controller 120 to determine the accuracy of mass flow controller 120.

Additionally, once volume 360 between mass flow controller valve and valve is determined, flow measurement may be conducted using the known volumes of chamber 305 and volume 360. This may be useful for high flow volumes where a large measurement volume is desirable.

Figure 8:
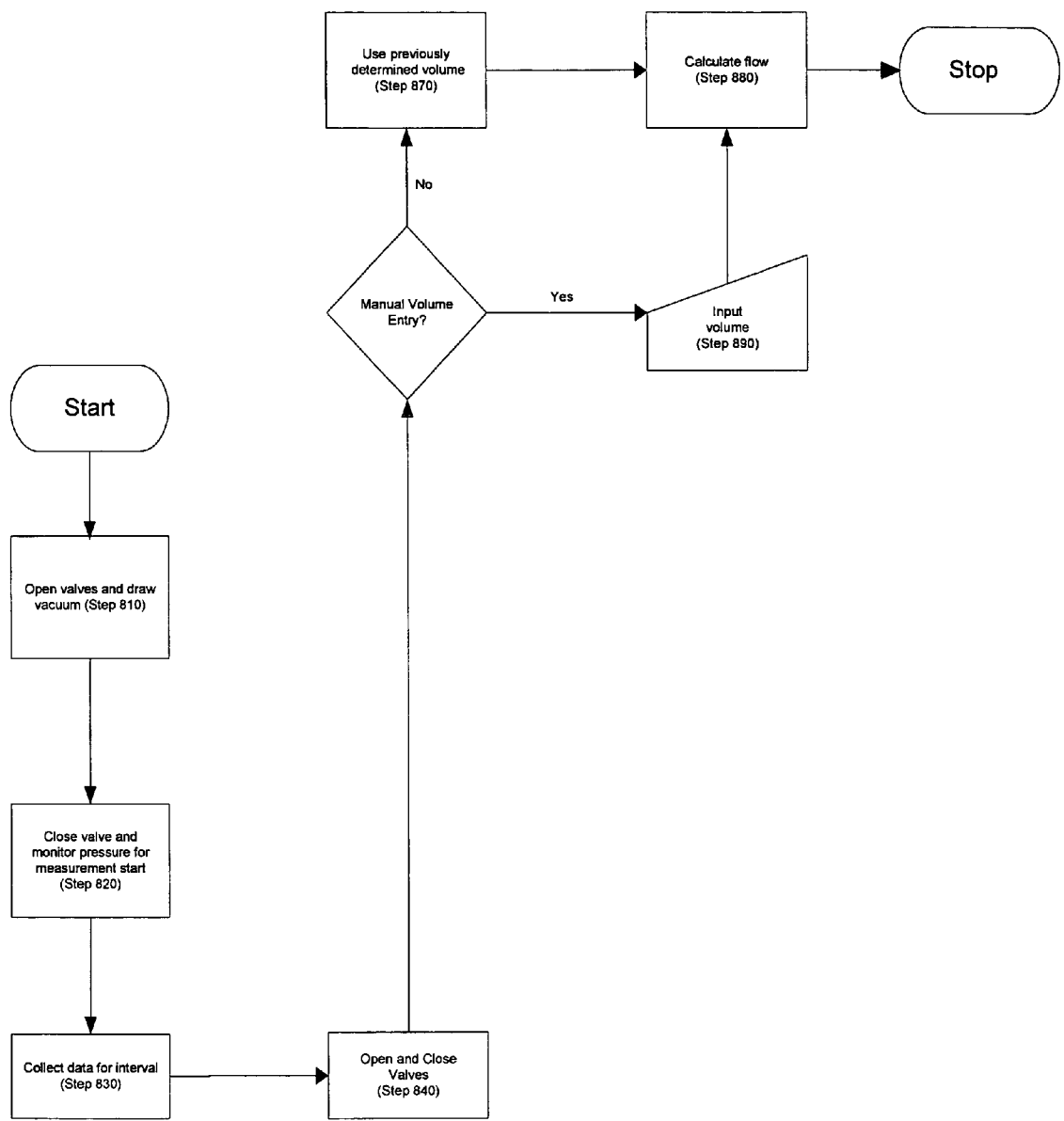

FIG. 8 illustrates one method for utilizing volume 360 and chamber 305 in combination for flow measurement or verification of mass flow controller 120. Valve 370 may be closed by a control system indicating that a flow measurement or validation of mass flow controller 120 is to be conducted. To conduct a test of mass flow controller, valves 310, 330 are opened and a vacuum is drawn (Step 810) by pump 380. Valve 330 is then closed and data taken for the initial state (Step 820). With mass flow controller 120 flowing based on a certain setpoint, data may then be collected over a first interval (Step 830), as discussed above.

After the conclusion of the first interval (Step 830), valve 330 may then be opened (Step 840), and flow attributes may then be calculated (Step 880) using Eq. 2 and Eq. 3, the previously determined measurement of volume 360 (Step 870), and the know volume of chamber 305. Alternatively, volume 360 may be input manually by a user (Step 890) and then flow attributes calculated (Step 880). The flow is then compared to the setpoint of mass flow controller 120 to determine the accuracy of mass flow controller 120.

In many cases, however, the error introduced into a rate of rise calculation may become significant. More particularly, as flow rates rise, the length of the line comprising volume 360 or other fluid elements in the path, such as valve 350, may alter the rate of change of pressure within volume 360 relative to the rate of change of pressure within the known volume of chamber 305. The alteration of the rate of change of pressure in volume 360 depends on the geometry of volume 360, the flow rate of mass flow controller 120, and upon the properties of the gas flowing through gas stick 302, and consequently makes the calculation of a flow rate and the commensurate verification of mass flow controller 120 extremely difficult. These effects may become particularly pronounced at flow rates above 200 sccm. Consequently, what is needed is a way to eliminate or compensate for these effects when measuring pressure and pressure changes or calculating the volume and flow rates.

In certain embodiments of the systems and methods disclosed, a choking orifice may be used in conjunction with a volume to accurately determine a flow rate irrespective of the geometry or pressure of the volume upstream of the choking orifice. Additionally, an error curve may be derived and fitted utilizing error points determined using the choking orifice. Subsequently, flow may be calculated without use of the choking orifice and adjusted based on the derived and fitted error curve.

Figure 9:
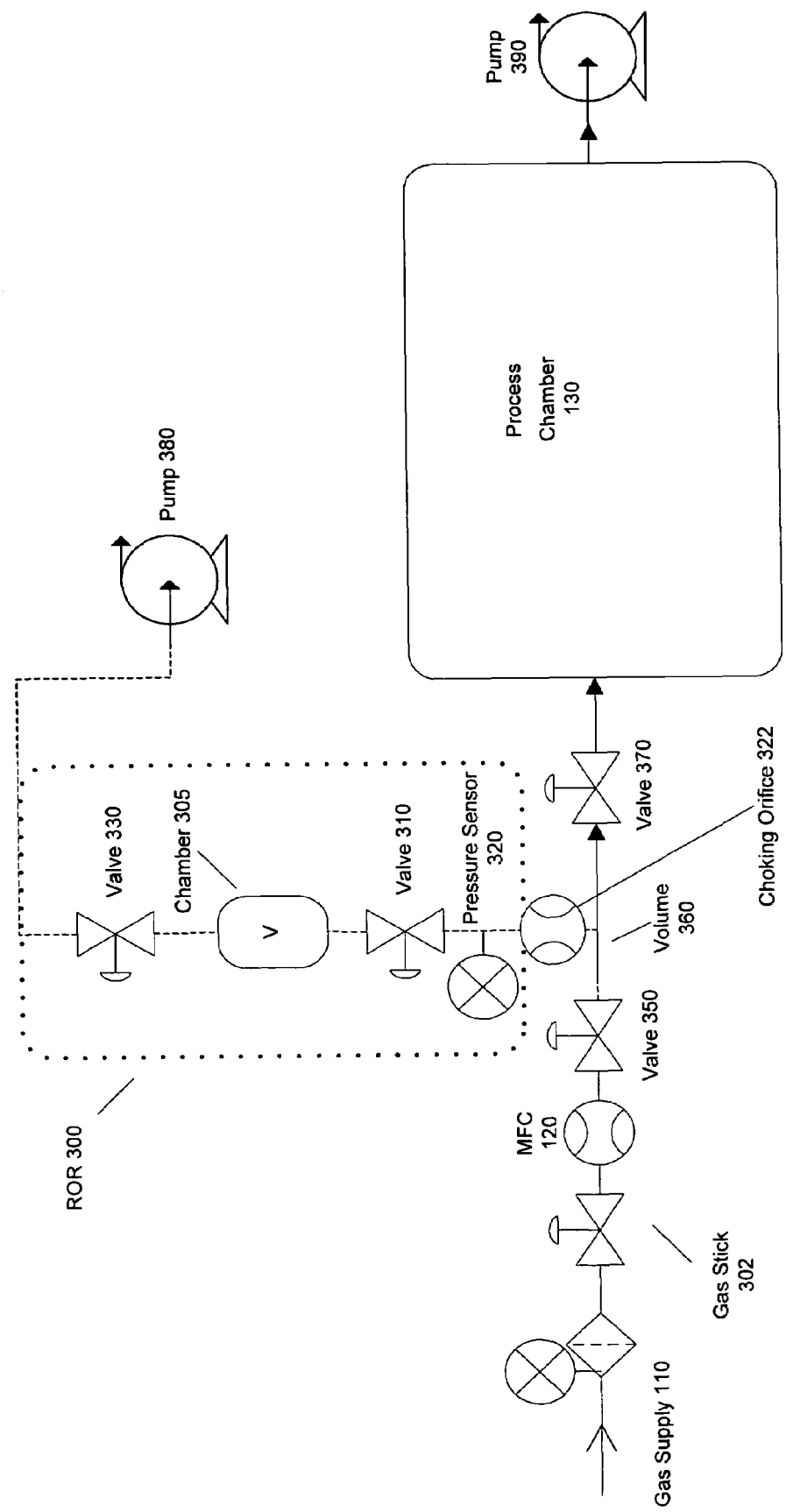
FIG. 9 includes a block diagram of one embodiment of a system for the validation of a mass flow controller.

FIG. 9 depicts one embodiment of a hardware arrangement which may be incorporated into the flow of gas in parallel to a process chamber which can physically compensate for the upstream pressure dependence through fluid shorting, or choking of the flow upstream of the measuring device. As described above with respect to FIG. 3, rate of rise system (ROR) 300 may be incorporated in the flow of gas through gas stick 302 to process chamber 130. In the particular embodiment depicted in FIG. 9, a choked orifice 322 is coupled between ROR 300 and valve 350, immediate to ROR 300. Choked orifice 322 may serve to diminish the effects of the geometry of volume 360 on pressure measurement and improve the usability and accuracy of ROR 300.

Choking orifice 322 may decrease the sensitivity of ROR 300 to the geometry of volume 360 through the use of a technique termed "fluid shorting". This technique narrows the fluid path so that the pressure in volume 360 is greater than that downstream of choking orifice 322. While many pressure gradients may serve to diminish the effects of the geometry of volume 360, for ideal efficacy choking orifice 322 should create a pressure gradient such that the pressure in volume 360 is at least twice the pressure downstream of choking orifice 322. This may cause the pressure upstream of choking orifice 322 to remain substantially constant during a constant rate of flow. In one embodiment, choking orifice 322 may be a multi-position valve which can be positioned according to the flow rate of the mass flow controller 120 to create the proper pressure gradient between volume 360 and ROR 300.

In another embodiment, choking orifice 322 may be a three way valve having the positions open, closed and choked as is known in the art. Gas stick 302 and process chamber 130 may function normally with choking orifice 322 in the closed position. When choking orifice 322 is in the open position, ROR 300 may function with gas stick 302 and process chamber 130 as described with respect to FIGS. 5-8. By placing choking orifice 322 in the choked position, however, a pressure gradient may be created between volume 360 and ROR 300 which allows a flow rate to be determined in ROR 300 independently of upstream pressure or volume. Because a flow rate in ROR 300 may be determined independently of volume 360 there is no need to take measurements for determining the geometry of volume 360.

For example, with respect to FIG. 5, there is no need for steps 540-570 and 590. In this case utilizing choke orifice 322, valve 370 may be closed by a control system indicating that a testing or validation of mass flow controller is to be conducted. To begin the test valves 310, 330 are opened and a vacuum is drawn (step 510) by pump 380. Valve 330 is then closed, choked orifice 322 may be set to the choked position and data may be taken for the initial state (Step 520). With mass flow controller 120 flowing based on a certain setpoint, data may then be collected for a first interval (Step 530). Time, pressure and temperature may be monitored for a certain period using sensors known in the art, such as pressure sensor 320. In some embodiments, the length of this period may be determined by a pressure or time checkpoint. For example, when the pressure within volume of chamber 305 reaches a certain Torr, the first interval may be concluded. The pressure at which the first interval concludes may vary greatly depending on the flow being measured, but is usually between 10 Torr and 1000 Torr. The first interval may also be concluded after a predetermined amount of time, usually at least 10 seconds, but not more than 60, seconds.

After the conclusion of this first interval (Step 530) flow attributes may then be calculated (Steps 580) using Eq. 2 and Eq. 3, without regards to volume 360. Consequently, a second interval is not needed and steps 540-570 and 590 may be eliminated solely by virtue of utilizing choking orifice 322.

It will be understood by those of skill in the art that, utilizing choking orifice 322, a similar reduction in steps may be achieved with the methods depicted in FIGS. 6-8 as well, and that the volume of chamber 305 may be utilized during a single transient phase to determine a flow rate and validate mass flow controller 120. Additionally, it will be understood that this same reduction in steps may be achieved irrespective of the implementation of choking orifice 322, for example a three position valve or multi-position valve.

While choking orifice 322 may be tuned for utilization with any flow rate, in one particular embodiment choking orifice 322 may be a three position valve wherein the choking orifice is tuned for use in creating a pressure gradient wherein the pressure in volume 360 is greater than two times the pressure downstream of choking orifice 322 for flow rates of 500 sccm or greater.

For flow rates below 500 sccm, then, the error introduced by volume 360 may be compensated for mathematically. To compensate for error mathematically an equation for an error term as a function of major variables, including the flow rate, geometry and type of gas may be derived for a particular geometry of volume 360. The equation may give the shape of the curve for the error introduced by a particular geometry of volume 360.

Figure 10:
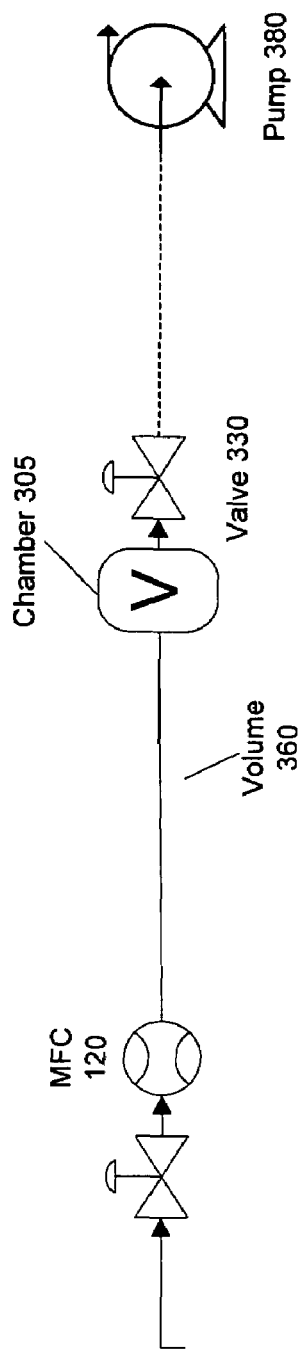
FIG. 10 includes a block diagram of one embodiment of the geometry of a path between a mass flow controller and a system like that depicted in FIG. 9.

For example, an equation can be derived for a flow correction term which for a case where volume 360 is like that depicted in FIG. 10, wherein volume 360 is a constant diameter tube. More specifically, an equation can be developed that shows the relationship between the average pressure in volume 360 and the average pressure in chamber 305 which is measured. This is given as:

$$P_{avg} = \tfrac{1}{3}(P1-P2)+P2 \qquad \text{Eq (4)}$$

The above equation can be used in conjunction with other equation to derive a flow correction term which will give the difference between the flow measured using Eq. (2) and the expected true flow which incorporates the additional information on the expected average pressure in volume 360:

Momentum Equation $$O = -\frac{dp}{dx} + \mu\left(\frac{d^2u}{2x^2} + \frac{d^2u}{2z^2}\right) \quad \text{Eq. (4.1)}$$

For cylindrical geometry:

$$\frac{1}{R}\frac{d}{dR}\left(R\frac{dy}{dR}\right) = \frac{1}{\mu}\frac{dp}{dx} \quad \text{Eq. (4.2)}$$

Since the pressure gradient is independent of R, Eq. 4.2 can be integrated to give:

$$u(R) = \frac{1}{u}\frac{dp}{dx}\frac{R^2}{4} + A\log R + B \quad \text{Eq. (4.3)}$$

Boundary conditions $u(0)=\text{finite} \Rightarrow A=0$ $$\mu(a) = 0 \Rightarrow B = -\left(\frac{dP}{dx}\right)\frac{a^2}{4\mu} \quad \text{Eq. (4.4)}$$

$$u(R) = -\frac{1}{4u}\frac{dp}{dx}(a^2 - R^2)$$

$$\mu_{avg} = -\frac{\int_0^{2\pi}\int_0^R \mu(R) r\, dr\, d\theta}{\int_0^{2\pi}\int_0^R r\, dr\, d\theta} = \frac{dp}{dx}\frac{R^2}{8\mu}$$

$$\dot{m} = \frac{\pi \dot{R}^4}{8uRT} P \frac{dp}{dx} \quad (\text{n. b. } \dot{R} \text{ is radius}) \quad \text{Eq. (4.5)}$$

$$p\, dp = \dot{m}\left(\frac{8\mu RT}{\pi \dot{R}^4}\right) dx$$

$$\int_{P_0}^{P_1} p\, dp = \int_0^L \dot{m}\frac{8\mu RT}{\pi \dot{R}^4} dx \quad \text{Assuming } T \text{ is constant}$$

$$\frac{1}{2}p^2 \bigg|_{P_0}^{P_1} = -\dot{m}\frac{8\mu RT}{\pi \dot{R}^4} L$$

$$\frac{1}{2}(P_0^2 - P_L^2) = -\dot{m}\frac{8\mu RT}{\pi \dot{R}^4} L$$

$$P_L^2 = \left(P_0^2 - \dot{m}\frac{16\mu RT}{\pi \dot{R}^4} L\right)$$

$$P_L = \left(P_o^2 - \dot{m}\frac{16u RT}{\pi \dot{R}^4} L\right)^{\frac{1}{2}} \quad \text{Eq. (5.1)}$$

$$\bar{P}_{avg} = \frac{\int_0^{L_1} P_{avg}\, dL}{\int_0^{L_1} dL} \quad \text{Eq. (5.2)}$$

In general for a quadratic function:

$$P = ax^2 + b \quad \text{Eq. (5.4)}$$
where $x = L\ P = P_L$ when $x = 0\ P = P_0$ $$P = aL^2 + P_0,\ a = \frac{P_L - P_0}{L^2}$$

$$P = \frac{P_L - P_0}{L^2} x^2 + P_0$$

-continued $$P_{avg} = \frac{\int_0^L P\, dx}{\int_0^L dx} \quad \text{Eq. (5.5)}$$

$$P_{avg} = \frac{\int_0^L \left(\frac{P_L - P_0}{L^2} x^2 + p_0\right) dx}{\int_0^L dx}$$

$$= \frac{\left(\frac{P_L - P_0}{L^2}\right)\frac{1}{3}x^3 + P_0 x \big|_0^L}{L}$$

$$= \frac{\left(\frac{P_L - P_0}{L^2}\right)\left(\frac{L^3}{3}\right) + P_0 L}{L}$$

$$P_{avg} = \frac{1}{3}(P_L - P_0) + P_0$$

$$P_{avg} = \frac{2}{3}P_0 + \frac{1}{3}P_L \quad \text{Eq. (5.6)}$$

$$P_0 = \left(\dot{m}\frac{16uRT}{\pi \dot{R}^4} L + P_L^2\right)^{\frac{1}{2}}$$

$$P_{avg} = \frac{2}{3}\left(\dot{m}\frac{16\mu RT}{\pi \dot{R}^4} L + P_L^2\right)^{\frac{1}{2}} + \frac{1}{3}P_L \quad \text{Eq. (5.7)}$$

$$\text{if } \dot{M} = \dot{m}\frac{16\mu RT}{\pi \dot{R}^4} L \quad \text{Eq. (5.8)}$$

if $P_L$ is a function of time

In one embodiment, $P_L = P_1 + At$ if $P = 0$ $$P_{avg}(t) = \frac{2}{3}\left((\dot{M}) + (At)^2\right)^{\frac{1}{2}} + \frac{1}{3}At \quad \text{Eq. (6.1)}$$

Usually, as the m term approaches zero the error becomes smaller. For a given mass flow the error may increase for increasing gas viscosity, the entire volume is then composed of two sections: volume 360 and chamber 305.

$$\dot{m} = \frac{\frac{(\Delta P_{avg}(t)_v V_v)}{RT_v}}{\Delta t} + \frac{\frac{\Delta P(t)_f V_f}{RT_f}}{\Delta t}$$

If the temperature is assumed to be the same:

$$\dot{m} = \frac{1}{R\Delta t T}(\Delta P_{avg}(t)_v V_v + \Delta P(t)_f V_f) \quad \text{Eq. (6.3)}$$

normally the $\Delta P(t)_v = \Delta P(t)_f$ so that $$\dot{m}_c = \frac{1}{R\Delta t T}(\Delta P(t)_f (V_v + V_f)) \quad \text{Eq. (6.4)}$$

The error in the calculated mass flow can then be estimated by subtracting the two expressions $m_e = m_c - m$ $$\dot{m}_e = \frac{1}{R\Delta tT}\left(\Delta P_f(t)_f V_v - \Delta P_{avg}(t)_v V_v\right) \quad \text{Eq. (7.1)}$$

The change in the average pressure can be substituted from Eq. 7.1 for simplicity if we assume $\Delta P(t)_f$ is begun at $t = 0$ and $P = 0$ then $\left(\frac{\Delta P}{\Delta t}\right)_f = A$ \quad Eq. (7.2)

$$\dot{m}_e = \frac{1}{RT}\left(AV_v - \frac{d}{dt}\left[\frac{2}{3}\left(M + (At)^2\right)^{\frac{1}{2}} + \frac{1}{3}At\right]V_v\right)$$

Eq. 7.2 appears to be well behaved. As the variable volume $V_v \to 0 \dot{m}_e \to 0$ \quad Eq. (7.3)

$\dot{M} \to 0, m_e \to 0$ $\dot{M} = \dot{m}\frac{16\mu RT}{\pi R^4}L$ to simplify, if $V_T = V_v + V_f$ $$\dot{m} = \frac{\Delta P(t)_f V_T}{RT\Delta t} \quad \text{Eq. (7.4)}$$

$$\dot{m} = \frac{1}{RT}(AV_T)$$

$$\dot{M} = \frac{1}{RT}(AV_T)\frac{16\mu RT}{\pi R^4}L \quad \text{Eq. (7.5)}$$

The derivative of Eq. 6.1 would yield:

$$\frac{dP_{avg}(t)}{dt} = \frac{d}{dt}\left[\frac{2}{3}(M + (At)^2)^{\frac{1}{2}} + \frac{1}{3}At\right] \quad \text{Eq. (8.1)}$$

$$\frac{dP_{avg}(t)}{dt} = \left[\frac{2}{3}\left(\frac{A^2t}{(M + (At)^2)^{\frac{1}{2}}}\right) + \frac{1}{3}A\right]$$

$$\dot{m}_e = \frac{1}{RT}\left(AV_v - \left[\frac{2}{3}\left(\frac{A^2t}{(M + (At)^2)^{\frac{1}{2}}}\right) + \frac{1}{3}A\right]V_v\right) \quad \text{Eq. (8.2)}$$

$$\dot{m}_e = \frac{v}{RT}\left[A - \left(\frac{2}{3}\left(\frac{A^2t}{\left(A(V+v)\frac{16\,\mu L}{\pi R^4} + (At)^2\right)^{\frac{1}{2}}}\right) + \frac{1}{3}A\right)\right] \quad \text{Eq. (9)}$$

where $V_v = (m^3)$, $R = 8.3149\left(\frac{Pa\,m^2}{mol\,K}\right)$, $T(K)$, $A\left(\frac{Pa}{s}\right)$, $\mu = (Pas)$, $L(m)$, $R(m)$, $t(s)$, $\dot{m}_e\left(\frac{mol}{s}\right)$, $1\;sccm = 7.41 \cdot 10^{-7}\frac{mol}{s}$ The A term is the pressure derivative in the chamber 305. The expected flow may then be given by adding the results of Eq. 9 to Eq. 2.

The variables $$\frac{16L}{\pi R^4}$$

is equivalent to a fluid path geometry term and is denoted H, the gas viscosity is the gas dependent term denoted G. Eq. 9 can be re-written as $$\dot{m}_e = \frac{V_v}{RT}\left[A - \left(\frac{2}{3}\left(\frac{A^2t}{\left(HGAV_T\frac{16\,\mu L}{\pi R^4} + (At)^2\right)^{\frac{1}{2}}}\right) + \frac{1}{3}A\right)\right] \quad \text{Eq. 10}$$

Figure 11:
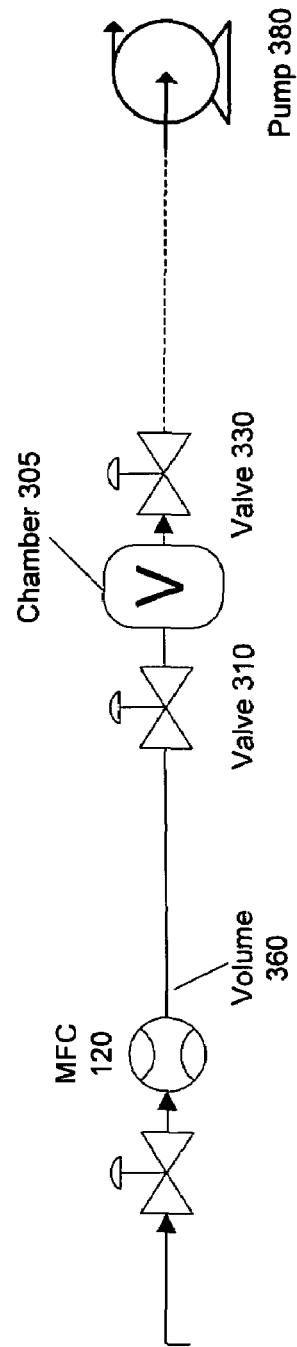
FIG. 11 includes a block diagram of one embodiment of the geometry of a path between a mass flow controller and a system like that depicted in FIG. 9.

Unfortunately, most geometries for flow measurement will not be as simple as that given in FIG. 10. However, the same formalism can be used to derive the appropriate equation for any geometry. A second common geometry may be the introduction of valve 310 directly upstream of chamber 305, as depicted in FIG. 11.

In this case the average pressure in the tube, volume 360, is given by equation 11 below.

$$P_{avg} = \frac{1}{3}(P1 - P3) + P3$$

where
P3=Pv+P2 and Pv is the pressure drop across valve 3.

The same technique can be used as was developed for Eq. 9 to develop an alternate equation that describes this particular geometry and it is given below:

$$\dot{m}_e = \frac{V_v}{RT}\left[A - \left(\frac{2}{3}\left(\frac{A_2^2 t}{\left(A(V_t)\frac{16\,\mu L}{\pi R^4} + (A_2 t)^2\right)^{\frac{1}{2}}}\right) + \frac{1}{3}A_2\right)\right] \quad \text{Eq. (11)}$$

where $A_2$ is the pressure derivative directly upstream of valve 330.

Once an equation has been derived for a particular geometry of volume 360, the actual error induced by a particular instance of volume 360 may then be empirically observed for flows over 500 sccm by using ROR 300 to calculate a flow rate at a series of flow settings for mass flow controller 120 while choking orifice 322 is in an open position versus calculating flow rates at the identical series of flow settings while choking orifice 322 in the choked position. By comparing the two flow rates calculated at each of these flow settings a set of points corresponding to an error curve for flow rates above 500 sccm may be determined. The curve described by the derived equation, for example Eq. 10, may then be fit to the empirically determined error points which occur above 500 sccm to generate an error equation describing a curve representing the error induced by the geometry of volume 360 at all flows.

Additionally, in many cases the error induced by volume 360 for flows of 200 sccm or less is statistically insignificant. Consequently, the actual flow observed at these flow rates may also be used in establishing points to which the error curve described by the equation may be fit.

While fitting the curve described by the equation to the empirically determined curve, the variables in the error equation which describe the error curve for a particular instance of geometry of volume may be calculated, including the geometry term (H). This error curve may then be applied to measurements and flow rates taken or calculated by ROR 300 in the future to correct the error induced by volume 360, allowing a more accurate calculation of the flow rate of mass flow controller 120. It will be understood that this error curve may be used to correct for the error introduced by volume 360 at all flow rates with choking orifice 322 in the open position allowing the volume of chamber 305 to be utilized during a single transient phase to more accurately determine a flow rate and validate mass flow controller 120.

Figure 12:
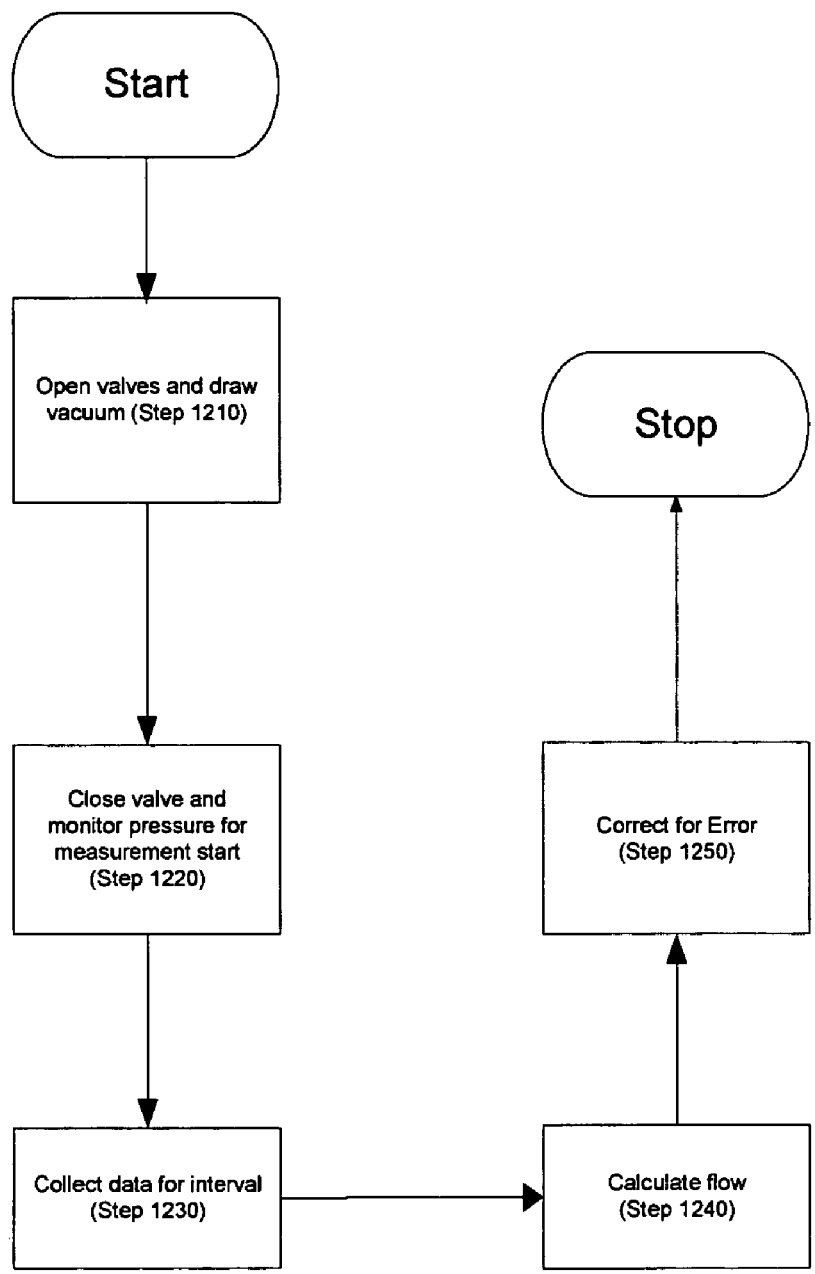
FIG. 12 includes a flowchart depicting one embodiment of a method to perform flow verification or validate the operation of a mass flow controller using the system depicted in FIG. 9.

FIG. 12 depicts one embodiment of a methodology for calculating a flow rate using ROR 300 and the equation describing the error curve, as elaborated on above. In this case, valve 370 may be closed by a control system indicating that a testing or validation of mass flow controller is to be conducted. To begin the test valves 310, 330 are opened and a vacuum is drawn (step 1210) by pump 380. Valve 330 is then closed and data taken for the initial state (Step 1220). With mass flow controller 120 flowing based on a certain setpoint, data may then be collected for a first interval (Step 1230). Time, pressure and temperature may be monitored for a certain period using sensors known in the art, such as pressure sensor 320. In some embodiments, the length of this period may be determined by a pressure or time checkpoint. For example, when the pressure within volume reaches a certain Torr, the first interval may be concluded. The pressure at which the first interval concludes may vary greatly depending on the flow being measured, but is usually between 10 Torr and 1000 Torr. The first interval may also be concluded after a predetermined amount of time, usually at least 10 seconds, but not more than 60, seconds.

After the conclusion of this first interval (Step 1230) flow attributes may then be calculated (Steps 1240) using Eq. 2 and Eq. 3, without regards to volume 360. These flow attributes may then be corrected for the error introduced by volume 360 by using a previously determined error equation (Step 1250), as described above. Consequently, a second interval is not needed and an accurate flow rate may be calculated at any flow setting with choking orifice 322 in an open position.

Additionally, in most cases, these equations may also be tailored to take into account the gas flowing through gas stick 302 when determining the error introduced when a flow rate is calculated using ROR 300. This may be done through the use of the gas viscosity term (G as shown in Eq. 10) whose value is determined based on the gas flowing through gas stick 302 or ROR 300. For example, gas term (G) may be one value for nitrogen gas and another value for one type of fluoride gas, etc. Using a different value for G depending on the gas, the resulting error curve can not only correct the calculated flow for the shape of volume 360, but can also correct the calculated flow for the viscosity of the gas flowing through gas stick 302.

It will be understood by those of ordinary skill in the art that the various steps, measurements, and calculations may be controlled and performed in a wide variety of ways, including by a control system embedded within ROR system 300, or by the control system utilized in conjunction with mass flow controller 120, gas stick 302 and process chamber 130.

It will also be understood that the empirically determined points used to fit the curve described by the equation will be determined based on the tuning and optimization of choking orifice 322. For example, if choking orifice 322 is tuned for use in creating a pressure gradient wherein the pressure in volume 360 is greater than two times the pressure upstream of choking orifice 322 for flow rates of 200 sccm or greater, the empirically determined points may be at flow rates of 200 sccm and higher.

Note that not all of the steps described with respect to FIGS. 5-8 and 12 are necessary, that a step may not be required, and that further steps may be utilized in addition to the ones depicted, including additional measurements, intervals etc. Additionally, the order in which each element of the methods is described is not necessarily the order in which it is utilized. After reading this specification, a person of ordinary skill in the art will be capable of determining which arrangement of steps will be best suited to a particular implementation.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A measurement system for measuring a rate of flow through a flow controller that can be operatively coupled to a fluid distribution system downstream of the flow controller, the measurement system comprising:
   an inlet;
   a pressure sensor operatively coupled to the inlet;
   a valve operatively coupled to the inlet downstream of the pressure sensor;
   a chamber having a known internal volume and operatively coupled to the valve downstream of the valve; and
   a choking orifice operatively coupled to the inlet upstream of the pressure sensor; the choking orifice having a choked position;
   wherein, when the inlet of the measurement system is operatively coupled to the fluid distribution system, the measurement system:
   collects first rate of pressure rise data pertaining to the chamber during a first interval in which the choking orifice is in the choked position and the rate of flow is sufficient that the pressure upstream of the choking orifice is approximately twice that of the pressure downstream of the choking orifice;
   calculates a first rate of flow through the flow controller based upon the first rate of pressure rise data, and the known internal volume of the chamber; and
   determines the measured rate of flow through the flow controller based upon the calculated first rate of flow.

2. The measurement system of claim 1, wherein the choking orifice is a three way valve having an open position, a closed position, and a choked position, the choked position causing the pressure upstream of the three way valve to be approximately twice that of the pressure downstream of the three way valve.

3. The measurement system of claim 1, wherein the choking orifice is a multi-position valve capable of being positioned to cause the pressure upstream of the multi-position valve to be approximately twice that of the pressure downstream of the multi-position valve dependent upon the rate of flow through the flow controller.

4. The measurement system of claim 1, wherein the first rate of pressure rise data includes a change in pressure in the chamber over the first interval.

5. The measurement system of claim 1, wherein the duration of the first interval is determined based upon the first rate of pressure rise data meeting a condition.

6. The measurement system of claim 1, wherein the duration of the first interval is a predetermined length of time.

7. The measurement system of claim 1, wherein the choking orifice further has an open position, wherein when the inlet of the measurement system is operatively coupled to the fluid distribution system, the measurement system is further operable to:
 collect second rate of pressure rise data pertaining to an internal volume of the fluid distribution system and an internal volume of the measurement system including the chamber during a second interval in which the choking orifice is in the open position;
 calculate a second rate of flow based upon the second rate of pressure rise data;
 calculate an error connection based upon the calculated first rate of flow and the calculated second rate of flow;
 collect third rate of pressure rise data pertaining to the internal volume of the fluid distribution system and the internal volume of the measurement system including the chamber during a third interval in which the choking orifice is in the open position; and
 determine the measured rate of flow through the flow controller based upon the third rate of pressure rise data and the calculated error correction.

8. The measurement system of claim 7, wherein the choking orifice is a three way valve having an open position, a closed position, and a choked position, the choked position causing the pressure upstream of the three way valve to be approximately twice that of the pressure downstream of the three way valve.

9. The measurement system of claim 7, wherein the choking orifice is a multi-position valve capable of being positioned to cause the pressure upstream of the multi-position valve to be approximately twice that of the pressure downstream of the multi-position valve dependent upon the rate of flow through the flow controller.

10. The measurement system of claim 7, wherein the first rate of pressure rise data includes a change in pressure over the first interval and the second rate of pressure rise data includes a change in pressure over the second interval.

11. The measurement system of claim 7, wherein at least one of the duration of the first interval and the duration of the second interval is determined based upon at least one of the first rate of pressure rise data and the second rate of pressure rise data meeting a condition.

12. The measurement system of claim 7, wherein at least one of the duration of the first interval and the duration of the second interval is a predetermined length of time.

13. A method of measuring a rate of flow through a mass flow controller that is operatively coupled to a fluid distribution system downstream of the flow controller, the fluid distribution system having a first region and a second region, the first region having a known first internal volume and the second region having a second internal volume, wherein the first volume is operatively coupled to the second region via a choking orifice having a choked position, the method comprising acts of:
 placing the choking orifice in the choked position;
 collecting first rate of pressure rise data pertaining to the first region during a first interval in which the choking orifice is in the choked position and the rate of flow is sufficient that the pressure upstream of the choking orifice is approximately twice that of the pressure downstream of the choking orifice; and
 calculating a first rate of flow through the flow controller based upon the first rate of pressure rise data, and the known first internal volume; and
 determining the measured rate of flow through the flow controller based upon the calculated first rate of flow.

14. The method of claim 13, wherein the choking orifice is a three way valve having an open position, a closed position, and a choked position, the method further comprising an act of:
 selecting, for use as the choking orifice, a three way valve that is tuned to have a choked position that causes the pressure upstream of the three way valve to be approximately twice that of the pressure downstream of the three way valve.

15. The method of claim 13, wherein the choking orifice is a multi-position valve, and wherein the act of placing the choking orifice in a choked position includes an act of placing the multi-position valve in a position to cause the pressure upstream of the multi-position valve to be approximately twice that of the pressure downstream of the multi-position valve dependent upon the rate of flow through the flow controller.

16. The method of claim 13, wherein the first rate of pressure rise data includes a change in pressure over the first interval.

17. The method of claim 13, wherein the duration of the first interval is determined based upon the first rate of pressure rise data meeting a condition.

18. The method of claim 13, wherein the duration of the first interval is a predetermined length of time.

19. The method of claim 13, wherein the choking orifice further has an open position, and wherein the act of determining the measured rate of flow through the flow controller includes acts of:
 placing the orifice in the open position;
 collecting second rate of pressure rise data pertaining to the first region and the second region during a second interval in which the choking orifice is in the open position;
 calculating a second rate of flow based upon the second rate of pressure rise data;
 calculating an error correction based upon the calculated first rate of flow and the calculated second rate of flow;
 collecting third rate of pressure rise data pertaining to the first region and the second region during a third interval in which the choking orifice is in the open position, and
 determining the measured rate of flow through the flow controller based upon the third rate of pressure rise data and the calculated error correction.

20. The method of claim 19, wherein the choking orifice is a three way valve having an open position, a closed position, and a choked position, the method further comprising an act of:
 selecting, for use as the choking orifice, a three way valve that is tuned to have a choked position that causes the pressure upstream of the three way valve to be approximately twice that of the pressure downstream of the three way valve.

21. The method of claim 19, wherein the choking orifice is a multi-position valve, and wherein the act of placing the choking orifice in a choked position includes an act of placing the multi-position valve in a position to cause the pressure upstream of the multi-position valve to be approximately twice that of the pressure downstream of the multi-position valve dependent upon the rate of flow through the flow controller.

22. The method of claim 19, wherein the first rate of pressure rise data includes a change in pressure over the first interval and the second rate of pressure rise data includes a change in pressure over the second interval.

23. The method of claim 19, wherein the act of collecting the first rate of pressure rise data is performed before the act of collecting the second rate of pressure rise data.

24. The method of claim 19, wherein at least one of the duration of the first interval and the duration of the second interval is determined based upon at least one of the first rate of pressure rise data and the second rate of pressure rise data meeting a condition.

25. The method of claim 19, wherein at least one of the duration of the first interval and the duration of the second interval is a predetermined length of time.

* * * * *